April 7, 1931.  E. A. STONE  1,799,262

FAN LUBRICATOR

Filed April 27, 1928

Inventor
Earl A. Stone,

By
Attorneys

Patented Apr. 7, 1931

1,799,262

UNITED STATES PATENT OFFICE

EARL A. STONE, OF DETROIT, MICHIGAN

FAN LUBRICATOR

Application filed April 27, 1928. Serial No. 273,204.

The present invention pertains to a lubricating system for a rotary fan, although the invention in its broadest aspect is applicable to various assemblies of a shaft and bearing.

The principal object of the invention is to provide a construction of this character wherein lubricant will be fed constantly and automatically to the bearing surfaces as the result of the rotation of the rotary member. More particularly, the rotary member carries a casing in which is contained a quantity of lubricant. The stationary member is hollow and is equipped with a conduit extending to the wall of the casing. Between the shaft and bearing is formed a passageway communicating with the interior of the hollow shaft and adapted to discharge into the casing. As the casing is revolved, the lubricant is driven by centrifugal force to the wall thereof and is further forced through the conduit and into the hollow fixed member, whence it flows to the bearing surfaces and returns to the casing. In this manner a circulation of lubricant is set up during actuation of the device.

The invention is fully disclosed by way of example in the following description and in the accompanying drawing, in which—

Reference to these views will now be made by use of like characters which are employed to designate corresponding parts throughout.

Figures 1, 2, 3:
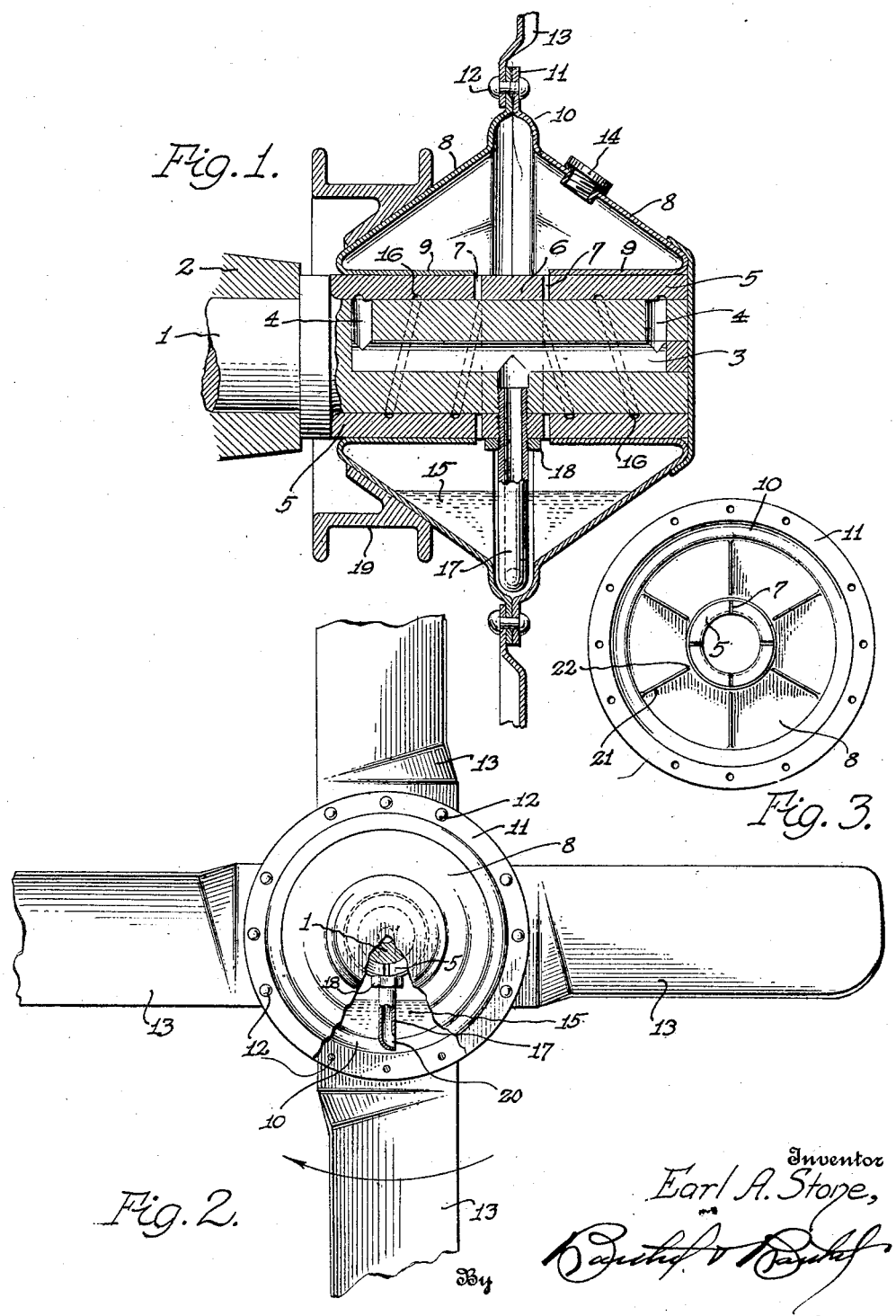
Figure 1 is a longitudinal section of a rotary fan equipped according to the invention.
Fig. 2 is an end view thereof, partly broken away and in section.
Fig. 3 is an elevation of one of the semi-sections of a modified construction.

In Figure 1 is illustrated a shaft 1 fixed in a suitable support 2 and having one end thereof formed with a longitudinal bore 3 at the ends of which are radial ducts 4. On this hollow portion of the shaft are mounted a pair of spaced rotatable bearings 5 between which is an annular thrust bearing 6. The latter is formed with radial slots 7 leading outwardly from the cylindrical surface of the shaft 1 at the ends of the thrust bearing.

On the bearings 5 is fixed a casing consisting of a pair of conical semi-sections 8 spaced base to base and bent inwardly at their smaller ends as at 9 to form sleeves by which the attachment to the bearings is made. The bases of the conical members are somewhat flared as at 10 and then flanged at 11 so that the flanges may be secured together by rivets or bolts 12 which also hold fan blades 13. One of the sections 8 has a filling cap 14 by which lubricant 15 may be charged into the casing formed by the two sections.

The inner wall of each of the bearings is formed with a spiral groove 16 having one end in communication with a duct 4 and the other end in communication with one of the radial slots 7 of the thrust bearing 6. These grooves may obviously be formed in the shaft 1 if desired. Further, a conduit 17 is passed radially through the thrust bearing and threaded into the shaft in a manner to communicate with the bore 3 at substantially the longitudinal center thereof. A locknut 18 is also threaded on the conduit to prevent the latter from working out of adjustment. One of the sections 8 carries a pulley 19 by which the fan is driven.

In the operation of the device, the application of power to the pulley 19 turns the blades 13 in the direction of the arrow in Figure 2. The outer end of the conduit 17 has an opening 20 which faces circumferentially and opposite to the direction of rotation. The lubricant is forced to the wall of the casing by centrifugal force and is driven into the conduit 17 through the opening 20 thereof.

It will also be seen that the portions 10 of the sections 8 provide an annular channel in which the inlet end of the conduit is conveniently received as the casing turns about the shaft and conduit. The lubricant which is thus forced into the conduit enters the bore 3 of the shaft and is driven through the ducts 4 into the grooves 16 to the slots 7 through which it is returned to the casing. The lubricant also spreads from the grooves to the entire bearing surface between the shaft and the bearings. In this manner a constant flow of lubricant between the bearing surfaces is maintained during rotation of the shaft, for the purpose of oiling and cooling.

In this connection the location of the slots 7 at the ends of the thrust bearing is of material value. This will be understood from the fact that the slots are thus held stationary while the ends of the bearings 5 rotate relatively thereto, the result being that all portions of the end faces of bearings 5 are carried past the lubricant in the slots 7, so that the end faces are completely lubricated; since the lubricant passage does not change in position, the action is uniform at all times.

In fact, the entire system is arranged in such manner that the moment the lubricant passes into conduit 17, its travel is subject only to the pressure applied by the centrifugal action at the entrance of the conduit. As a result, the action is uniform, with the movement of the lubricant dependent upon the pressure set up by the speed of movement of the casing.

In the modification shown in Figure 3 the sections 8 are formed with radial partitions 21 which aid in carrying the lubricant around the shaft in order that it may be forced into the conduit 17, for otherwise the lubricant might remain stationary during high velocity of the casing. The partitions terminate short of the bearings, as indicated by the numeral 22 so that the lubricant will be distributed among the several compartments formed by the partitions. These partitions may be straight or curved, according to the results desired.

Although specific embodiments of the invention have been illustrated and described, it will be understood that various alterations in the details of construction may be made without departing from the scope of the invention as indicated by the appended claims.

What I claim is:

1. In a fan, a casing adapted to contain lubricant, a bearing in said casing adapted for application to a shaft, said casing being formed of a pair of oppositely-facing hollow sections the walls of which are relatively thin in cross-section, the body of each section including a tubular portion adapted to fit the bearing and a portion flaring outwardly in the direction of the uniting plane of the sections, each section being flanged to permit uniting of the sections on such uniting plane, said sections being generally symmetrical in cross-section to provide the uniting plane substantially central of the width of the casing, a cross-section of the assembled sections presenting the section walls as forming an outwardly-extending recess of approximately semi-circular cross-section, said recess being symmetrical to the uniting plane, and means of communication extending from said recess to the interior of the said bearing.

2. In a fan, a casing adapted to contain lubricant, a bearing in said casing adapted for application to a shaft, said casing being formed of a pair of oppositely-facing hollow sections the walls of which are relatively thin in cross-section, the body of each section including a tubular portion adapted to fit the bearing and a portion flaring outwardly in the direction of the uniting plane of the sections, each section being flanged to permit uniting of the sections on such uniting plane, said sections being generally symmetrical in cross-section to provide the uniting plane substantially central of the width of the casing, a cross-section of the assembled sections presenting the section walls as forming an outwardly-extending recess of approximately semi-circular cross-section, said recess being symmetrical to the uniting plane, and a conduit having one end extending into said recess, and the other end in communication with the interior of said bearing.

3. In a fan, a casing adapted to contain lubricant, a bearing in said casing adapted for application to a shaft, said casing being formed of a pair of oppositely-facing hollow sections the walls of which are relatively thin in cross-section, the body of each section including a tubular portion adapted to fit the bearing and a portion flaring outwardly in the direction of the uniting plane of the sections, each section being flanged to permit uniting of the sections on such uniting plane, said sections being generally symmetrical in cross-section to provide the uniting plane substantially central of the width of the casing, a cross-section of the assembled sections presenting the section walls as forming an outwardly-extending recess of approximately semi-circular cross-section, said recess being symmetrical to the uniting plane, and a conduit having one end extending into said recess, and the other end in communication with the interior of said bearing, the first named end of said conduit facing circumferentially of the casing.

4. In a fan, a fixed hollow shaft, a pair of bearings mounted on said shaft, a thrust bearing between said first named bearings, said thrust bearing having end slots, a casing carried by said bearings, grooves formed between said shaft and bearings and having one end in communication with the slots of said thrust bearing, the remaining ends of said grooves being in communication with the interior of said shaft, and a conduit extending from said hollow shaft outwardly towards said casing.

5. In a fan, a fixed hollow shaft, a pair of bearings mounted on said shaft, a thrust bearing between said first named bearings, said thrust bearing having end slots, a casing carried by said bearings, grooves formed between said shaft and bearings and having one end in communication with the slots of said thrust bearing, the remaining ends of said grooves being in communication with the interior of said shaft, a conduit extending from said hollow shaft outwardly towards said casing, and radial partitions formed in said casing and permitting communication between the compartments formed thereby.

6. In a shaft and bearing assembly, a casing adapted to contain lubricant, a bearing in said casing adapted for application to a shaft, said casing being formed of a pair of oppositely-facing hollow sections the walls of which are relatively thin in cross-section, the body of each section including a tubular portion adapted to fit the bearing and a portion flaring outwardly in the direction of the uniting plane of the sections, each section being flanged to permit uniting of the sections on such uniting plane, the body of each section being outwardly bulged between the flared portion and the flange, the assembled sections presenting said bulged portions in facial relation to produce an annular recess positioned approximately central of the width of the section assembly with the recess providing the major radius of the interior of the sections, and means of communication extending from said recess to the interior of said bearing.

7. In a shaft and bearing assembly, a casing carried by said bearing, a groove formed between said bearing and shaft, said groove having one end in communication with the interior of said shaft and the other end in communication with said casing, said casing being formed of a pair of oppositely-facing hollow sections the walls of which are relatively thin in cross-section, the body of each section including a tubular portion adapted to fit the bearing and a portion flaring outwardly in the direction of the uniting plane of the sections, each section being flanged to permit uniting of the sections on such uniting plane, the body of each section being outwardly bulged between the flared portion and the flange, the assembled sections presenting said bulged portions in facial relation to produce an annular recess positioned approximately central of the width of the section assembly with the recess providing the major radius of the interior of the sections, and a conduit extending from the interior of said shaft outwardly into said recess.

In testimony whereof I affix my signature.

EARL A. STONE.